United States Patent
Hays et al.

(10) Patent No.: US 7,208,117 B2
(45) Date of Patent: Apr. 24, 2007

(54) AUTOMATED PROCESS FOR INHIBITING CORROSION IN AN INACTIVE BOILER CONTAINING AN AQUEOUS SYSTEM

(75) Inventors: George F. Hays, Morristown, NJ (US); Vladimir Grigorov, Boonton, NJ (US); Lois J. Neil, Long Valley, NJ (US); Bruce L. Lubutti, Teaneck, NJ (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 11/287,876

(22) Filed: Nov. 28, 2005

(65) Prior Publication Data

US 2006/0157420 A1    Jul. 20, 2006

Related U.S. Application Data

(60) Provisional application No. 60/632,167, filed on Nov. 30, 2004.

(51) Int. Cl.
*C23F 11/06*    (2006.01)

(52) U.S. Cl. .......... 422/3; 210/743; 210/746; 210/750; 210/757; 422/13; 422/16

(58) Field of Classification Search ......... 210/743
See application file for complete search history.

(56) References Cited

U.S. PATENT DOCUMENTS

| | | | | |
|---|---|---|---|---|
| 4,399,098 A * | 8/1983 | Cuisia | .......... | 422/13 |
| 4,557,835 A * | 12/1985 | Lorentz | .......... | 210/748 |
| 4,830,757 A * | 5/1989 | Lynch et al. | .......... | 210/742 |
| 4,905,721 A * | 3/1990 | Muccitelli | .......... | 137/2 |
| 5,500,185 A * | 3/1996 | Cutler et al. | .......... | 422/16 |
| 5,747,342 A * | 5/1998 | Zupanovich | .......... | 436/55 |
| 6,336,058 B1 * | 1/2002 | Fowee | .......... | 700/266 |
| 6,418,958 B1 * | 7/2002 | Rossi et al. | .......... | 137/93 |

* cited by examiner

*Primary Examiner*—Peter A. Hruskoci
(74) *Attorney, Agent, or Firm*—David L. Hedden

(57) ABSTRACT

This invention relates to an automated process to inhibit corrosion of the metal surface of an inactive boiler containing water.

8 Claims, 1 Drawing Sheet

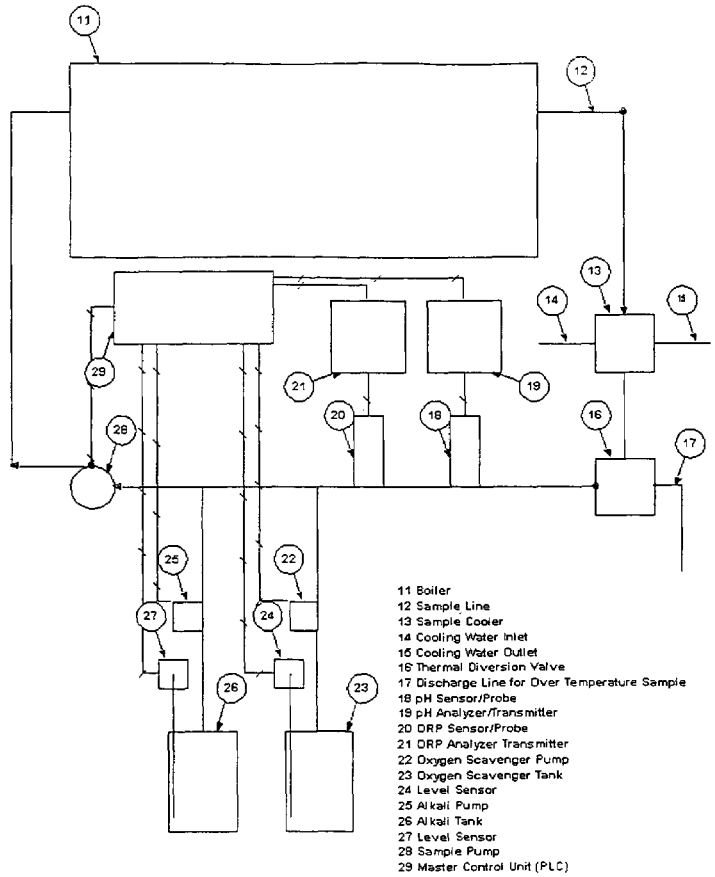

11 Boiler
12 Sample Line
13 Sample Cooler
14 Cooling Water Inlet
15 Cooling Water Outlet
16 Thermal Diversion Valve
17 Discharge Line for Over Temperature Sample
18 pH Sensor/Probe
19 pH Analyzer/Transmitter
20 ORP Sensor/Probe
21 ORP Analyzer Transmitter
22 Oxygen Scavenger Pump
23 Oxygen Scavenger Tank
24 Level Sensor
25 Alkali Pump
26 Alkali Tank
27 Level Sensor
28 Sample Pump
29 Master Control Unit (PLC)

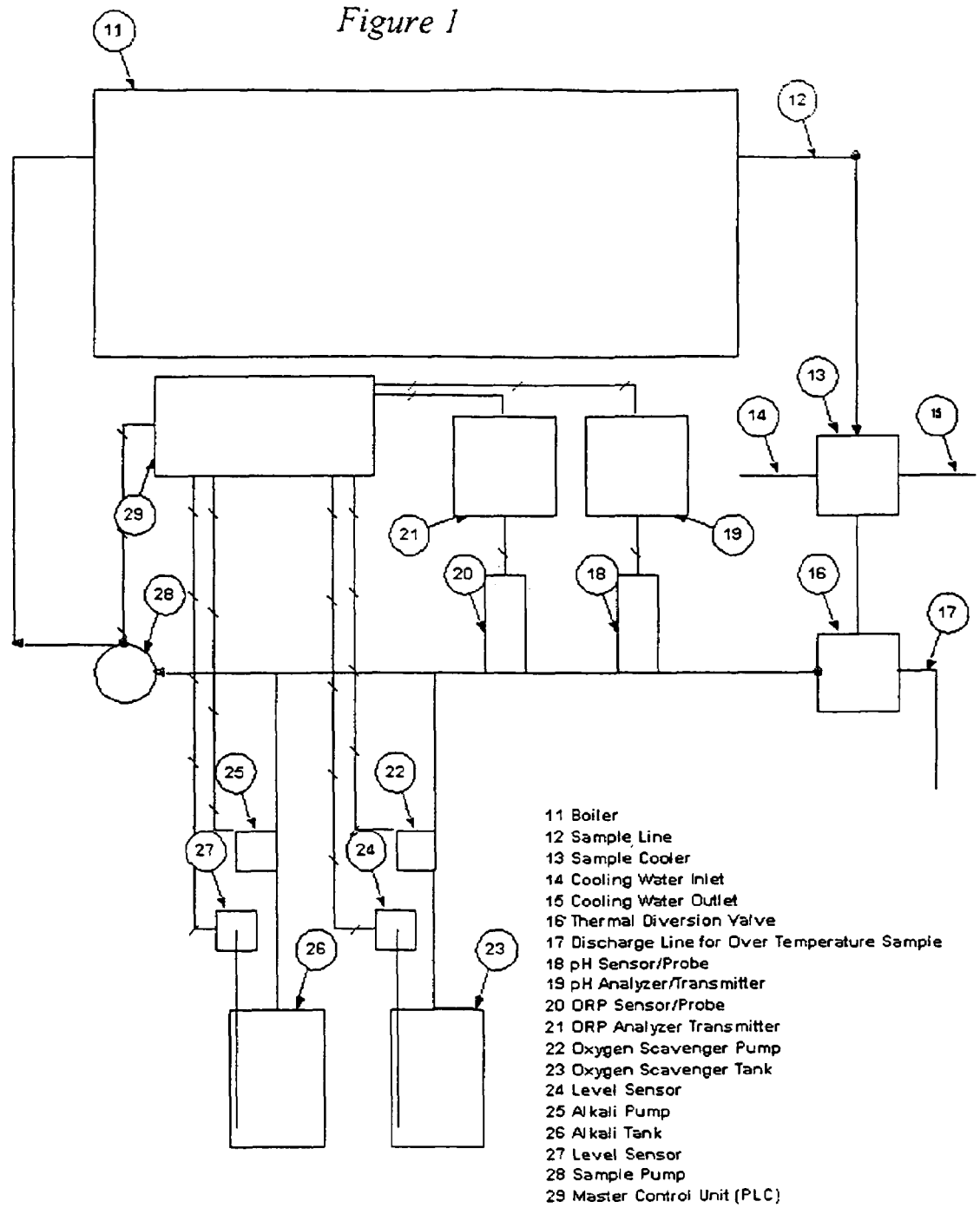

Figure 1

11 Boiler
12 Sample Line
13 Sample Cooler
14 Cooling Water Inlet
15 Cooling Water Outlet
16 Thermal Diversion Valve
17 Discharge Line for Over Temperature Sample
18 pH Sensor/Probe
19 pH Analyzer/Transmitter
20 ORP Sensor/Probe
21 ORP Analyzer Transmitter
22 Oxygen Scavenger Pump
23 Oxygen Scavenger Tank
24 Level Sensor
25 Alkali Pump
26 Alkali Tank
27 Level Sensor
28 Sample Pump
29 Master Control Unit (PLC)

AUTOMATED PROCESS FOR INHIBITING CORROSION IN AN INACTIVE BOILER CONTAINING AN AQUEOUS SYSTEM

CROSS REFERENCE TO RELATED APPLICATIONS AND CLAIM TO PRIORITY

This application is a continuation-in-part application of provisional application Ser. No. 60/632,167 filed on Nov. 30, 2004, the contents of which are hereby incorporated into this application. This application claims the benefit of provisional application Ser. No. 60/632,167 filed on Nov. 30, 2004.

TECHNICAL FIELD OF THE INVENTION

This invention relates to an automated process to inhibit corrosion of the metal surface of an inactive boiler containing water.

BACKGROUND OF THE INVENTION

A boiler is a significant part of an investment in a ship, a manufacturing plant, a commercial facility or the like. Accordingly, when such a facility is idle, some effort is often made to prevent the loss of this investment to corrosion. The addition of an oxygen scavenger (reducing agent) and an alkalizing agent to the water of an inactive boiler is one way to inhibit internal corrosion. Hydrazine is a common reducing agent used as a chemical oxygen scavenger to protect against corrosion Typically, inactive boilers are ignored because they do not pose any immediate safety hazard or other risk. In the marine industry, there are vessels that are "mothballed" for extended periods at a time. Such vessels are left unattended, except for a watchman making his or her rounds. Historically, when the vessel's boilers are laid up wet (full of water), nobody monitors the boiler water chemistry for months at a time. Overtime air (oxygen) enters the water system of the boiler and depletes the reducing agent added to the system.

Eventually, corrosion will occur and remain undiscovered until the boiler is placed back on line. By then there may have been sufficient corrosion to cause failure of boiler tubes under operating pressures. Such failures may require substantial time to repair, during which time the vessel must remain out of service or be substantially limited in its service capability. Such repairs are costly and time consuming. Furthermore, if they occur while the vessel is at sea, the vessel, its cargo, and its personnel may be at risk, particularly if the vessel becomes dead in the water.

Hydrazine has been used as a chemical oxygen scavenger to protect against corrosion caused by oxygen in laid up boilers for over 30 years, but the hydrazine is administered to the boiler manually. Manual treatment leaves much to be desired. The hydrazine is either dumped into an expansion tank with distilled, de-ionized, or a mixture with shore water (oxygen saturated) and then water is drained out of the bottom blowdown to allow the chemical treatment to enter the boiler, or the treatment is injected into the feedwater line with a chemical pump. When the former method is used, much of the hydrazine is wasted because the treatment contains fresh water saturated with oxygen, which depletes the oxygen scavenging effect of the hydrazine. When the latter method is used, the feedwater pump must be run to transport the treatment into the boiler and some of the boiler water will have to be drained out to make room. In both cases, the secondary disadvantage is the change in boiler water chemistry that results from the fresh water.

All citations referred to in this application are expressly incorporated by reference.

BRIEF DESCRIPTION OF THE DRAWINGS

FIG. 1 is a representative schematic of one embodiment of the invention.

BRIEF SUMMARY OF THE INVENTION

This invention relates to an automated process for inhibiting the corrosion of the internal surface of an inactive boiler containing water comprising:
  (a) adding an initial amount of oxygen scavenger to the boiler water to provide an oxygen scavenger level of at least of at least 50 ppm of oxygen scavenger in the boiler water, preferably at least 100 ppm, most preferably at least 200 ppm;
  (b) adding an initial amount of alkali to the boiler water to provide a pH of about 8.5 to about 11.0, preferably about 9.0 to about 10.0;
  (c) automatically monitoring the pH and the oxidation-reduction potential (ORP) of the boiler water; and
  (f) adjusting the pH of the boiler water by adding alkali to the boiler water to maintain a pH between about 8.5 to about 11.0, preferably about 9.0 to about 10.0, and automatically adjusting the ORP by adding an oxygen scavenger to the boiler water to maintain an ORP more negative than −120 mV, preferably below −200 mV.

The invention also relates to an apparatus for monitoring and adjusting the water chemistry of boiler waters comprising: a sample supply line with access to the water of an inactive boiler; a pH probe and pH analyzer; an oxidation-reduction potential probe and oxidation-reduction analyzer; a supply tank for alkali and a supply tank for reducing agent; and a master control unit that communicates with the pH analyzer, the oxidation-reduction potential analyzer and the supply tanks. The master control unit monitors the pH and the oxidation-reduction potential and adjusts the chemistry of the boiler water by adding sufficient alkali from the alkali supply tank and sufficient reducing agent from the reducing agent supply tank to maintain the pH of the boiler water within a pH range from about 8.5 to about 11.0, and an oxidation-reduction potential of more negative than −120 mV, preferably below −200 mV.

The process provides corrosion protection during boiler lay-up by automatically feeding an oxygen scavenger and/or an alkali to maintain the boiler water chemistry within acceptable limits. Human intervention is only required when the level of chemical in a supply tank is below the established minimum or when the feed of a prescribed amount of chemical fails to bring the treatment within acceptable limits, such as when the level of water in the boiler is lowered or when instruments require recalibration.

DETAILED DESCRIPTION OF THE DRAWINGS

FIG. 1 is a schematic representation of one embodiment describing the process and the apparatus used for performing that process. A sample line 12 is connected to a boiler 11. The sample line withdraws water from the boiler periodically or continuously using a sample pump 28. Periodic measurement is often sufficient, for example, one measurement per week. The sample is optionally directed to sample cooler 13 with cooling water inlet 14 and cooling water outlet 15. A thermal diversion valve 16 with discharge line 17 forwards the sample to be analyzed by a pH sensor/probe 18, and an oxidation-reduction potential (ORP) sensor/probe 20. It is to be understood that the order of analysis is not important. The ORP potential can just as well be measured prior to the measurement of pH. A pH analyzer/transmitter 19 and ORP analyzer/transmitter 21 are connected to the pH sensor 18 and ORP sensor 20, respectively.

The process apparatus also includes storage tanks 23 and 26 for holding the reducing agent and alkali, respectively. These chemicals are added to the boiler water as needed depending upon the water chemistry as determined by the measurements of pH and ORP. The apparatus includes reducing agent pump 22, reducing agent tank 23, reducing agent level sensor 24, alkali pump 25, alkali tank 26, and alkali level sensor 27. The system is controlled by a Maser Control Unit (PLC) 29.

DETAILED DESCRIPTION OF THE INVENTION

The process can be used to inhibit corrosion in any inactive boiler. Examples of such boilers include steam generating boilers such as those installed on vessels, in power generating stations, pulp mills, oil refineries and chemical plants. The metal surface of the boiler generally comprises carbon steel and thus is susceptible to corrosion if exposed to water and oxygen. The process is useful for inhibiting localized and general corrosion.

Typically, the capacity of the boiler is measured and the amount of oxygen scavenger required to provide a level of at least 50 ppm is calculated according to methods well known in the art.

The pH and ORP are detected by the use of appropriate sensors installed in a supply line through which water is circulated from the boiler. Following the measurements, the sample water can be returned to the boiler or discarded. The sensors are connected to respective pH and ORP analyzers/transmitters, which in turn are connected to a Programmable Logic Controller (PLC). The apparatus provides for the automatic adjusting of the feed of alkali and reducing agent to the boiler water in order to maintain acceptable pH and ORP levels. The apparatus includes a circulating pump and may also include a sample cooler, a thermal protection device, checkvalve(s), low level sensors for the chemical supply tanks and output signal capability for alarms. If needed additional alkali or reducing agent are added to the boiler water. The process apparatus can also include safety valves and interlocks to protect the various components from high temperature and low flow conditions.

The pH of the boiler water is measured by a sensor, e.g. a Rosemount model 396 pH. The pH of the boiler water is maintained between about 8.5 to 11.0, preferably from about 9.0 to about 10.0. The pH of the boiler water is maintained by automatically feeding sufficient amounts of alkalizing agent to the boiler water. Typical alkaline chemicals that can be used to maintain the pH in the acceptable levels include solutions of ammonia, amines such as cyclohexylamine, morpholine and diethylethanolamine, or, preferably, sodium hydroxide, potassium hydroxide or various combinations of both. Most preferably used as the alkaline chemical is sodium hydroxide.

ORP is a measure of the residual reductive environment in the boiler water and any vapor phase above the boiler, rather than the chemistry of the reducing agent. The ORP of the boiler water is measured by a sensor, e.g. Rosemount model 396ORP. Based upon empirical data, it has been found that the ORP of the boiler water should not be more positive than −120 mV, preferably −200, mV, in order to inhibit corrosion in an inactive boiler containing water. The acceptable ORP level is maintained by automatically feeding sufficient amounts of oxygen scavenger to the boiler water. Any oxygen scavenger may be used, e.g. sodium sulfite, diethyl hydroxylamine (DEHA), hydrazine, and methyl ethyl ketoxime (MEKO) blended with a primary hydroxylamine such as isopropyl hydroxylamine (IPHA). Preferably used as the oxygen scavenger is hydrazine.

The feed and feedrate of oxygen scavenger is preferably regulated by an oxidation-reduction (ORP) analyzer, sensor, and a Master Control Unit. Alternatively, it may also be fed through an on/off cycling mechanism based upon the ORP.

The feed and feedrate of alkali is preferably regulated by a pH analyzer, sensor, and a Master Control Unit.

The total control system consists of a Master Control Unit, which is a PLC (programmable logic controller)-based system comprising control logic and an operator interface. Any PLC and operator interface-based system can be used. The Master Control Unit regulates all aspects of feeding alkali and oxygen scavenger to the boiler water and may provide a safety interlock to prevent overfeed of chemicals, so that effective operation is insured in a safe manner. The master control unit can also initiate alarms, collect and store critical operating data, and provide a means to download said data either remotely or locally. Remote download may be accomplished via telephone or cellular technology.

The oxidation-reduction potential of the boiler water is preferably measured with an oxidation-reduction potential sensor. The sensor is typically held by a probe that contains wires, which communicate the signal to the outside of the aqueous environment, where it is connected to a cable or other communications device to communicate the signal to an analyzer/transmitter. The sensor itself is typically located within the aqueous environment. Sensors, which are in direct contact with the boiler water, are connected to the ORP analyzer. The primary ORP analyzer monitors the oxidation-reduction potential of the boiler water and feeds the information to the Master Control Unit. The Master Control Unit then regulates the feed of alkali and oxygen scavenger to the boiler, based upon input from the ORP analyzer.

The apparatus can also contain a signal mechanism, e.g. an alarm, to notify monitoring personnel when the pH and/or the ORP are outside acceptable levels. Either factor could result in an accelerated rate of corrosion of the internal metal surface of the boiler. The process variables are monitored by and the alarms are signaled by the Master Control Unit. The signal can be registered at a location station remote from the apparatus that monitors and adjusts the feed chemicals. The signal can indicate that human intervention is required to make adjustments to the chemicals fed into the boiler water and/or that the supply of chemicals in the tanks is low. The time interval for sounding the alarm will be different for different boilers based on the holding capacity of the boiler, the location of the sample line from which the boiler water is circulated to the probes, and the location of the point where the sample plus treatment is returned to the boiler. It may vary from less than 5 minutes to more than 15 minutes. The type of human intervention required can appear on the device screen While the process has been described with reference to one or more embodiments, those skilled in the art will understand that various changes may be made and equivalents may be substituted for elements thereof without departing from the scope of what is claimed. In addition, many modifications may be made to adapt a particular situation or material to the teachings of the disclosure without departing from the essential scope of what is claimed. Therefore, it is intended that the claims not be limited to a particular embodiment disclosed, but include all embodiments falling within the scope of the appended claims.

Abbreviations and/or Definitions

ORP oxidation-reduction potential.

ORP analyzer measures oxidation-reduction potential in millivolts.

EXAMPLES

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated.

Example 1

(Automated Process for Inhibiting Corrosion in Inactive Boiler Using Sodium as the Alkaline Chemical and Hydrazine as the Oxygen Scavenger)

The subject of this is example is a boiler on-board a ship that is laid up awaiting future use. The boiler has a capacity of 5–9 tons. The amount of hydrazine to obtain a minimum amount of hydrazine, equivalent to 200 ppm, is calculated as follows:

Assume there are 8 ppm oxygen in the water at ambient temperature. The amount of hydrazine needed to maintain a residual of 200 ppm hydrazine is 8+200=208 ppm hydrazine.

For 5 tons capacity, the amount of hydrazine needed is $208 \times 5 \times 1{,}000 \, Kg/10^6 = 1.04$ Kg hydrazine.

The pH of the boiler is measured with a Rosemount model 396 pH. Sufficient sodium hydroxide is added to the water to raise the pH to 10.0. The ORP of the water is measured with a Rosemount model 3960ORP. Sufficient hydrazine is added to water to raise the ORP to −200 mV.

An apparatus for monitoring the pH and ORP and automatically feeding alkali and hydrazine is constructed similar to that described in FIG. 1. The apparatus contains an alarm that is sounded at a remote location when human intervention is required to adjust the alkali or hydrazine in the system, or the supply of the feed chemicals in the supply tanks needs to be supplemented.

We claim:

1. An automated process for inhibiting the internal corrosion of a boiler containing water comprising:
    (a) adding an initial amount of oxygen scavenger to the boiler water to provide a concentration of oxygen scavenger of at least 50 ppm;
    (b) adding an initial amount of alkaline chemical to the boiler water to provide a pH of about 8.5 to about 11.0;
    (c) automatically monitoring the pH and the oxidation-reduction potential of the boiler water; and
    (d) adjusting the pH of the boiler water by adding more alkaline chemical to the boiler water to maintain a pH between about 8.5 to about 11.0, and adjusting the ORP by adding more oxygen scavenger to the boiler water to maintain an ORP more negative than −120 mV,
wherein said boiler is an inactive boiler.

2. The process of claim 1 wherein the concentration of oxygen scavenger is at least 200 ppm, the pH is from 9.0 to 10.0, and the ORP is more negative than −200 mV.

3. The process of claim 2 further comprising producing a signal at a monitoring station that is activated if the pH or the ORP are outside acceptable levels, or there is insufficient alkaline chemical or oxygen scavenger available in respective supply tanks.

4. The process of claim 3 where the signal is registered at a location stationed remotely from the monitoring station.

5. The process of claim 4 wherein an apparatus comprising a PLC, a pH monitor, an ORP monitor, appropriate tubing and pumps is used to monitor and adjust the feed of the alkaline chemical and oxygen scavenger to the boiler water.

6. The process of claim 5 wherein the alkaline chemical is selected from the group consisting of sodium hydroxide, potassium hydroxide, and mixtures thereof.

7. The process of claim 1, 3, 4, 5, or 6 wherein the oxygen scavenger is hydrazine and the adjusting step (d) is carried out manually after a signal is received indicating that an adjustment is required.

8. The process of claim 1, 3, 4, 5, or 6 wherein the oxygen scavenger is hydrazine and the adjusting step (d) is carried out automatically.

* * * * *